2,056,715

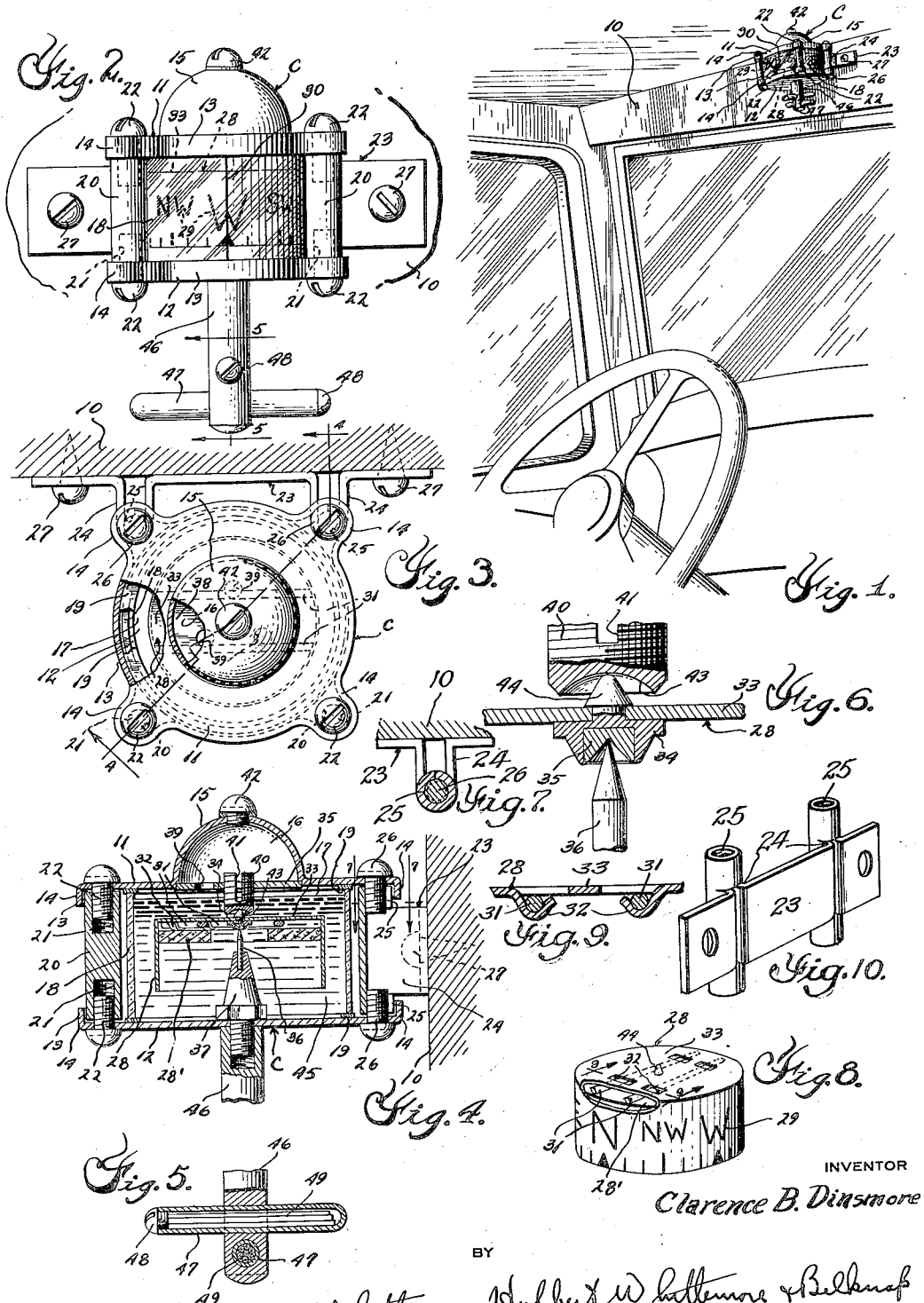
Oct. 6, 1936. C. B. DINSMORE 2,056,715
COMPASS
Filed Feb. 12, 1934
INVENTOR
Clarence B. Dinsmore Patented Oct. 6, 1936

UNITED STATES PATENT OFFICE 2,056,715

COMPASS

Clarence B. Dinsmore, Flint, Mich.

Application February 12, 1934, Serial No. 710,926

7 Claims. (Cl. 33—223)

This invention relates to compasses and more especially to those designed for use in connection with automobiles, boats, airplanes, and the like, and has as its objects to simplify, render more efficient and improve generally devices of this character.

The invention has as one of its important objects to provide a compass of this character which is distinguished by simplicity; may be economically manufactured; and assembled with facility.

Another object of the invention is to provide a device of this character in which the design and structure of several of the major parts thereof are such that these parts may be produced by stamping the same from sheet metal, or the like. Another object of the invention is to provide a compass having a compass card of novel design with simple means for mounting the magnets therein.

Still another object of the invention is to provide a compass of this character embodying means whereby the compass may be quickly and easily corrected to counteract the magnetic action of the metal or other disturbing factors in the vehicle in which the compass is mounted.

Numerous objects and novel details of construction will become more apparent as this description proceeds, especially when considered in connection with the accompanying drawing, wherein Figure 1 is a fragmentary perspective view of a portion of a motor vehicle with my improved compass associated therewith;

Figure 2 is a front elevational view of the compass;

Figure 3 is a top plan view of the compass with certain parts broken away to show the interior construction;

Figure 4 is a sectional view taken substantially on the plane indicated by line 4—4 in Figure 3;

Figure 5 is a detail sectional view taken substantially on the plane indicated by line 5—5 in Figure 2;

Figure 6 is an enlarged fragmentary sectional view of the compass card mounting;

Figure 7 is a detail sectional view taken substantially on the plane indicated by line 7—7 in Figure 4;

Figure 8 is a perspective view, partly broken away, of the compass card;

Fig. 9 is a detail sectional view, slightly enlarged, taken substantially on the plane indicated by line 9—9 in Figure 8, and Figure 10 is a perspective view of the compass bracket.

Referring now more particularly to the drawing wherein like reference characters indicate like parts, it will be noted that in Figure 1 there is illustrated fragmentarily a vehicle in the form of a motor car having a header or body portion 10, arranged forwardly of the seat normally occupied by the driver, on which the compass C is mounted. While this position is usually selected to mount the instrument, because of its strategic location, nevertheless it is obvious that the compass may be mounted at any preferred or desired position.

The compass comprises upper and lower headers or plates 11 and 12 which are preferably formed of sheet metal and capable of being produced by stamping. Each of the headers is provided with a peripheral flange 13 and with a plurality of equally spaced radially arranged ears 14.

The upper header 11 is formed with a substantially cup-shaped enlargement 15 adapted to produce an expansion chamber 16 for a purpose to be more fully hereinafter referred to.

Arranged between the headers 11 and 12 and cooperating therewith to form a compass chamber 17 is a cylindrical tubular member 18 formed preferably of some transparent material such as glass or the like. In assembling the parts, this tubular wall member 18 is clamped between the headers 11 and 12 and a fluid tight joint is provided between the parts by interposing gaskets 19 between the edges of the tubular member 18 and the headers 11 and 12.

Interposed between the headers 11 and 12 adjacent the front side thereof are posts 20 which are tapped as at 21 to receive screws 22 which pass through the headers 11 and 12 and into the tapped openings 21 as will be apparent from Figure 4.

The reference character 23 indicates a bracket so designed and constructed that the same may be formed from stamping of sheet metal or the like. This bracket is provided intermediate its ends with return-bent portions 24 which constitute posts corresponding to the posts 20 heretofore referred to. These return-bent portions 24 at the top and bottom edges thereof are horizontally split throughout a portion of their length and the tongues thus formed are curled to form cylindrical or circular portions 25 which are, in assembled position, disposed adjacent the headers 11 and 12. These cylindrical portions 25 may be threaded to receive the screws 26 which correspond to the screws 22 engaging the front posts 20. The extremities of the bracket are apertured to receive screws 27 by means of which the bracket is attached to a support such for instance as the header 10. The reference character 28 indicates the compass card which is formed of thin sheet metal, preferably aluminum or some other light material, and is substantially inverted cup-shaped. Indicia 29 indicating the points of the compass are displayed on the outer cylindrical surface of the compass card, this indicia being visible through the transparent wall 18 and cooperating with a finder line 30 inscribed on the wall 18. The primary magnets 31 of the compass are mounted in the upper part of the cup-shaped card 28 and are preferably held in place by means of tongues 32 cut and pressed from the head 33 of the card and bent around the magnets 31 in the manner shown probably most clearly in Figure 9. This provides a simple, convenient, but efficient means for assembling the magnets with the card. The compass card 28 is provided with a center 34 preferably furnished with a jewel 35 in the recess of which the center spindle 36 engages. This center spindle 36 is mounted in a support 37 secured to the lower header 12.

For the purpose of floating some of the weight of the compass card, I preferably provide a member 28' of cork or some other light material. This member 28' may be positioned within the compass card as illustrated by lightly pressing the same therein. This member will float in the fluid in the compass chamber and relieve the pivot of a part of the weight of the compass card and thus produce a more sensitive instrument.

The expansion chamber 16 is divided from the compass chamber 17 by a partition 38 in the form of a plate secured across the mouth of the expansion chamber, this plate being provided preferably with a plurality of apertures 39 providing communication between the expansion chamber and the compass chamber.

For retaining the compass card on its center spindle 36, I preferably provide an adjustable abutment 40 in the form of a screw threaded through the partition 38. This abutment member will be provided with a slot 41 engageable by a tool for rotating the same, which tool may be inserted through an opening in the expansion chamber wall 15 which opening is normally closed by a threaded plug 42. Thus during assembly or thereafter, the abutment 40 may be adjusted from the exterior of the device and extreme accuracy in dimensions of the parts need not be adhered to. The lower face of the adjustable abutment 40 is recessed, as indicated at 43 in Figure 6, to receive a projection 44 carried by the card 28 and located opposite the center 34. The projection 44 need not engage the surface of the recess 43 as the function of the abutment is merely to prevent the card from moving away from the center spindle 36 sufficiently so as to unseat the same.

The compass chamber 17 is preferably filled to substantially the level indicated with a fluid 45 which acts as a dampener to prevent undue oscillations of the compass card and to sufficiently retard movement thereof so that accurate readings of the compass may be quickly had.

Depending from the center of the lower header 12 is a post or the like 46 which carries corrector housings 47 preferably extending at right angles to one another. These housings are each open at one end, the open end in each instance being closed as for instance by means of a screw plug 48. These corrector housings are adapted to receive one or more corrector magnets 49 which are inserted when the compass is oriented to counteract the magnetic action or any other disturbing influence of the metal of the vehicle on which the compass is mounted. When correction has been made, the screw plugs 48 are put in place to seal the corrector housings 47.

The expansion chamber 16 is in direct communication with the compass chamber 17 and provides an air chamber which permits expansion of the dampening fluid 45 contained in the compass chamber. Moreover, the partition 38 thereof provides a convenient means of mounting the adjustable abutment 40 in a manner to permit a subsequent adjustment thereof in the manner heretofore referred to.

As will be apparent, a number of the major parts of the assembly may be stamped from sheet metal, and it will also be obvious that the construction may not only be economically produced, but is capable of facile assembly.

While one embodiment of the invention has been described and illustrated herein somewhat in detail, it will be apparent to those skilled in the art that various changes may be resorted to without departing from the spirit and scope of the invention, and to this end reservation is made to make such changes as may come within the purview of the accompanying claims.

What I claim as my invention is:

1. In a compass, a substantially cup-shaped compass card formed of sheet metal and comprising a cylindrical portion and a head at one end thereof, tongues struck from the material of said head, and a magnet secured within the cylindrical portion of said card and against said head by means of said tongues being bent around said magnet.

2. In a compass of the class described, a pair of spaced headers, a wall member clamped therebetween and cooperating therewith to form a compass chamber, a bracket provided with a return-bent portion constituting a post arranged between said headers, said return-bent portion being shaped to provide cylindrical portions threaded to receive securing screws, and screws extending through said headers and into said cylindrical portions, for the purpose set forth.

3. In a compass of the class described, a pair of headers formed of sheet metal and arranged in spaced relation, a wall member arranged between said headers and cooperating therewith to form a compass chamber, posts arranged between said spaced headers and secured thereto, a bracket formed of sheet metal and provided with return-bent portions intermediate its length to form posts arranged between said headers, each of said return-bent portions being partially split horizontally to produce tongues which are curled to form cylindrical portions, and securing screws extending through said headers and threaded into said cylindrical portions aforesaid, as and for the purpose set forth.

4. In a compass of the character described, a pair of headers, a wall member clamped between said headers and cooperating therewith to form a compass chamber, a center spindle mounted on one of said headers, a compass card mounted on said center spindle, a substantially inverted cup-shaped portion pressed from the other of said headers and forming an expansion chamber, a partition carried by said header dividing said expansion chamber from said compass chamber, and an abutment adjustable toward and from said spindle mounted on said partition for preventing accidental disengagement of said card and center spindle.

5. In a compass of the character described, a pair of headers, a wall member clamped between said headers and cooperating therewith to form a compass chamber, a center spindle mounted on one of said headers, a compass card mounted on said center spindle, a substantially inverted cup-shaped portion pressed from the other of said headers and forming an expansion chamber, a partition carried by said header dividing said expansion chamber from said compass chamber, an abutment adjustable toward and from said spindle mounted on said partition for preventing accidental disengagement of said card and center spindle, there being an aperture in the wall of said expansion chamber through which a tool may be inserted to adjust said abutment, and a plug for closing said aperture.

6. In a compass of the character described, a pair of headers, a wall member arranged therebetween and cooperating therewith to form a compass chamber, a center spindle, a compass card mounted on said center spindle, a support for said center spindle carried by the bottom header and extending therethrough to the exterior of said compass chamber, a supporting member secured to the projecting portion of said center spindle support, and means carried by last named supporting member spaced from said compass chamber for receiving correcting magnets, for the purpose set forth.

7. In a compass of the character described, a pair of headers, a cylindrical wall of transparent material clamped between said headers and cooperating therewith to form a compass chamber, a center spindle in said compass chamber carried by one of said headers, a compass card mounted on said center spindle, a projection on said compass card, a substantially cup-shaped portion pressed from the other of said headers and forming an expansion chamber, a partition carried by said header dividing said expansion chamber from said compass chamber, and an adjustable abutment mounted on said partition having a recess therein for receiving the projection on said compass card and operable to prevent accidental disengagement of said card and center spindle.

CLARENCE B. DINSMORE.